(12) United States Patent
Campagna et al.

(10) Patent No.: US 12,185,437 B2
(45) Date of Patent: *Dec. 31, 2024

(54) SYSTEM AND METHOD OF COMMISSIONING A BUILDING CONTROL SYSTEM

(71) Applicant: Crestron Electronics, Inc., Rockleigh, NJ (US)

(72) Inventors: Michael Campagna, Woodcliff Lake, NJ (US); Benjamin M. Slivka, Hillsdale, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,360

(22) Filed: Oct. 12, 2023

(65) Prior Publication Data

US 2024/0040682 A1    Feb. 1, 2024

Related U.S. Application Data

(63) Continuation of application No. 17/564,180, filed on Dec. 28, 2021, now Pat. No. 11,825,574.

(60) Provisional application No. 63/131,360, filed on Dec. 29, 2020.

(51) Int. Cl.
| | |
|---|---|
| *H05B 45/22* | (2020.01) |
| *G06V 10/56* | (2022.01) |
| *H04W 8/00* | (2009.01) |
| *H05B 47/165* | (2020.01) |
| *H05B 47/19* | (2020.01) |

(52) U.S. Cl.
CPC ............. *H05B 45/22* (2020.01); *G06V 10/56* (2022.01); *H04W 8/005* (2013.01); *H05B 47/165* (2020.01); *H05B 47/19* (2020.01)

(58) Field of Classification Search
CPC ...... H05B 45/22; H05B 47/165; H05B 47/19; H05B 47/199; G06V 10/56; H04W 8/005; H04W 4/33; H04L 12/2809; H04L 41/0893; H04L 43/045; H04L 43/0817; H04L 41/0806; H04L 67/125
See application file for complete search history.

(56) References Cited

U.S. PATENT DOCUMENTS

| | | | | |
|---|---|---|---|---|
| 9,521,009 | B1 * | 12/2016 | Skeffington | ............ H04W 4/33 |
| 10,880,977 | B1 * | 12/2020 | Cavacuiti | ................ H04W 4/33 |
| 2016/0330819 | A1 * | 11/2016 | Leadford | ............... H05B 47/19 |
| 2016/0366751 | A1 * | 12/2016 | Xu | ......................... H05B 47/10 |

(Continued)

*Primary Examiner* — Daniel D Chang
(74) *Attorney, Agent, or Firm* — Crestron Electronics, Inc.

(57) ABSTRACT

Systems, methods, and modes for commissioning of a building control system comprising at least one controller and a plurality of electronic devices installed in a building and comprising at least one light source adapted to illuminate light of a plurality of colors. The at least one controller is adapted to iteratively divide a selected number of the plurality of electronic devices into groups of electronic devices and command each group of electronic devices to illuminate a different color, receive an identification of an illuminated color of an electronic device to be commissioned, and select electronic devices belonging to a group commanded to illuminate a color that matches the identified illuminated color until the electronic device to be commissioned is identified.

20 Claims, 8 Drawing Sheets

(56) References Cited

U.S. PATENT DOCUMENTS

2018/0027635 A1* 1/2018 Roquemore, III ........................... H04W 52/0229 315/307
2019/0250575 A1* 8/2019 Jonsson ................ G06F 16/284

* cited by examiner

SYSTEM AND METHOD OF COMMISSIONING A BUILDING CONTROL SYSTEM

BACKGROUND OF THE INVENTION

Technical Field

Aspects of the embodiments relate to building control systems, and more specifically to systems, methods, and modes for commissioning a building control system.

Background Art

Building automation is ever evolving to provide consumers with convenient and simple control and monitoring of various mechanical and electrical equipment within a building through building control systems. Building control systems provide comfort, convenience, simplicity and security, as well as lower energy costs. They utilize a network of control devices and sensors distributed throughout a residential or commercial building to control and provide information of the mechanical and electrical equipment within the building. For example, the system can control one or more of heating, ventilation and air conditioning (HVAC), lighting, shading, security, appliances, door locks, and audiovisual (AV) equipment, among others, for every room in each facility.

Building control systems are implemented in buildings of varying degree of complexity. They are not only available today for high-end installations, but are becoming popular and more accessible to mid-range and residential installations due to decreasing costs, developments in technology, and improvements in simplicity of use. But even in smaller scale buildings, such as residential homes, there may be hundreds of devices dispersed in a plurality of rooms. Building control systems utilize software that controls devices in response to predetermined commands or scheduled events and display building status to system users. Users can utilize this data to control devices on-demand, change scheduled events, as well as to change climate set points, lighting scenes, and shade levels for occupied and vacated states in one or more rooms.

Yet, the commissioning of control systems is a long and complicated process. It becomes even more complex of building control systems in large installations, such as commercial facilities. Typically, after an installer has installed lights, shades, keypads, sensors, etc., throughout a building, programmers can commission the system by identifying the devices, associating identified devices together in groups, associating controllable devices with control points, and setting presets, schedules, scenes and building rules.

As technologies develop, many controllable devices or loads have now become "smart" or intelligent by being integrated with microcontrollers and communication interfaces capable of directly communicating with a building control system. For example, recessed fixtures with light emitting diodes (LEDs) are increasingly used to provide lighting to commercial and residential structures. These LED lamps and fixtures provide many benefits over conventional lighting technologies, such as color temperature or full color control in addition to dimming. Such LED lamps and fixtures are equipped with drivers that regulate power to the LED in response to receiving control commands from a building control system. This only adds more complexity to commissioning a building control system as the number of devices that now need to be commissioned have increased even in simple installations. While there are some current solutions to simplify the commissioning process, these are inadequate. Any improvements that reduce cost, time, and mistakes is beneficial to users.

Accordingly, a need has arisen for a quicker and simpler commissioning of a building control system.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for commissioning of a building control system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a system is provided for commissioning a building control system comprising: a plurality of electronic devices installed in a building each adapted to communicate over a communication network and comprising at least one light source adapted to emit light of a plurality of colors; and at least one controller in communication with the plurality of electronic devices over the communication network. The at least one controller is adapted to iteratively select one or more of the plurality of electronic devices to commission, command the selected electronic devices to emit a plurality of different assigned colors, and receive an identification of at least one illuminated color of an electronic device to be commissioned until the electronic device to be commissioned is identified.

According to an embodiment, the at least one controller is further adapted to iteratively select groups of the selected electronic devices, and command the selected groups to emit the plurality of different assigned colors. The at least one controller may be further adapted to select electronic devices belonging to a group of electronic devices commanded to emit an assigned color that matches the identified color. The at least one controller may be further adapted not to select electronic devices belonging to groups commanded to emit assigned colors that do not match the identified color.

According to an embodiment, the plurality of different assigned colors may comprise a plurality of single colors with each single color assigned to one of the electronic devices. According to another embodiment, the plurality of different assigned colors may comprise a plurality of different color temperatures. According to yet another embodiment, the plurality of different assigned colors may comprise a plurality of sequences of colors with each color sequence assigned to one of the electronic devices.

According to an embodiment, the identification of the at least one illuminated color may be received from a user interface. According to another embodiment, the identification of the at least one illuminated color may be detected by and received from a camera. According to a further embodiment, the identification of the at least one illuminated color may be detected by and received from a light color sensor.

According to an embodiment, the at least one controller may be further adapted to measure wireless signal strengths of one or more of the electronic devices and select a number of electronic devices with the strongest wireless signal strengths.

According to an embodiment, the at least one controller may be further adapted to assign the identified electronic device to a logical object. The logical object may comprise a group of identified electronic devices. According to an embodiment, the at least one controller may be further adapted to assign the logical object to a selected function.

According to an embodiment, the at least one light source may comprise a multicolored light emitting diode. According to another embodiment, the at least one light source may comprises a red-green-blue light emitting diode. According to an embodiment, the at least one controller may comprise a mobile device, a control processor of the building control system, a remote server, or any combinations thereof.

According to an embodiment, the at least one controller may be further adapted to discover the plurality of electronic devices connected to the communication network. According to an embodiment, the at least one controller may be adapted to select assigned colors based on a number of the selected electronic devices, based on colors capable of being illuminated by the selected electronic devices, or based on any combinations thereof.

According to another aspect of the embodiments, a system is provided for commissioning a building control system comprising: a plurality of electronic devices installed in a building each adapted to communicate over a communication network and comprising at least one light source adapted to emit light of a plurality of colors; and at least one controller in communication with the plurality of electronic devices over the communication network. The at least one controller is adapted to: select one or more of the plurality of electronic devices to commission; divide the selected electronic devices into groups and assign each group to a different color; command each group of electronic devices to illuminate the assigned color; receive an identification of an illuminated color of an electronic device to be commissioned; select electronic devices belonging to a group commanded to emit an assigned color that matches the identified color; and repeat commanding selected electronic devices to illuminate different colors until the electronic device to be commissioned is identified.

According to a further aspect of the embodiments, a system is provided for commissioning a building control system comprising a plurality of electronic devices installed in a building each comprising at least one light source adapted to emit light of a plurality of colors; and a mobile device comprising a camera and a controller in communication with the plurality of electronic devices. The at least one controller is adapted to iteratively select one or more of the plurality of electronic devices to commission, command the selected electronic devices to emit a plurality of different assigned colors, and detect an illuminated color of an electronic device to be commissioned via the camera until the electronic device to be commissioned is identified.

According to yet a further aspect of the embodiments, a system is provided for commissioning a building control system comprising: a plurality of electronic devices installed in a building each adapted to communicate over a communication network and comprising at least one light source adapted to emit light of a plurality of colors; and a mobile device comprising a camera and a controller in communication with the plurality of electronic devices. The at least one controller is adapted to iteratively select one or more of the plurality of electronic devices to commission, command the selected electronic devices to emit different color sequences, detect a color sequence illuminated by an electronic device to be commissioned via the camera, and identify the electronic device to be commissioned based on the detected color sequence.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
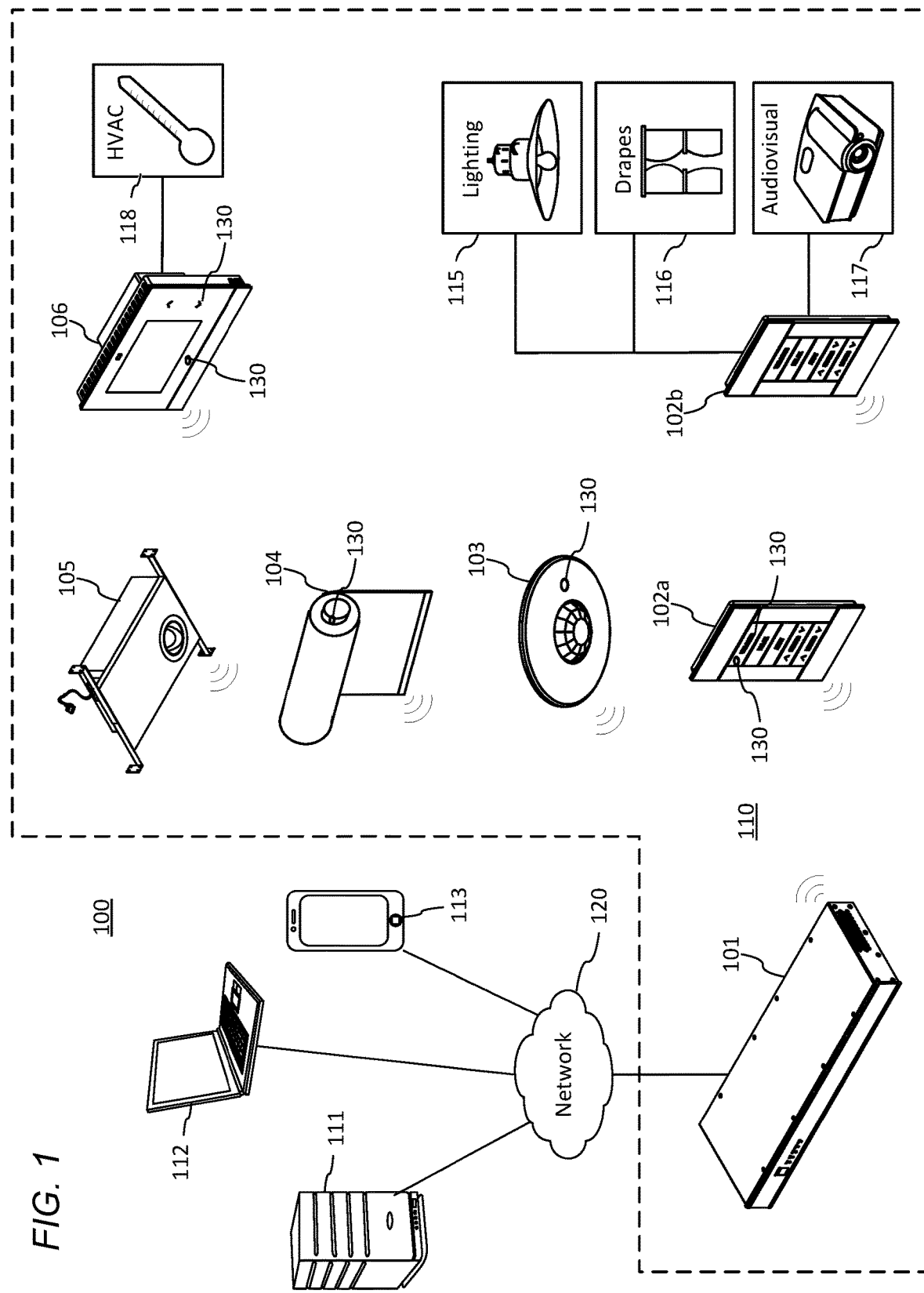

FIG. 1 illustrates a building control system according to an illustrative embodiment.

Figure 2:
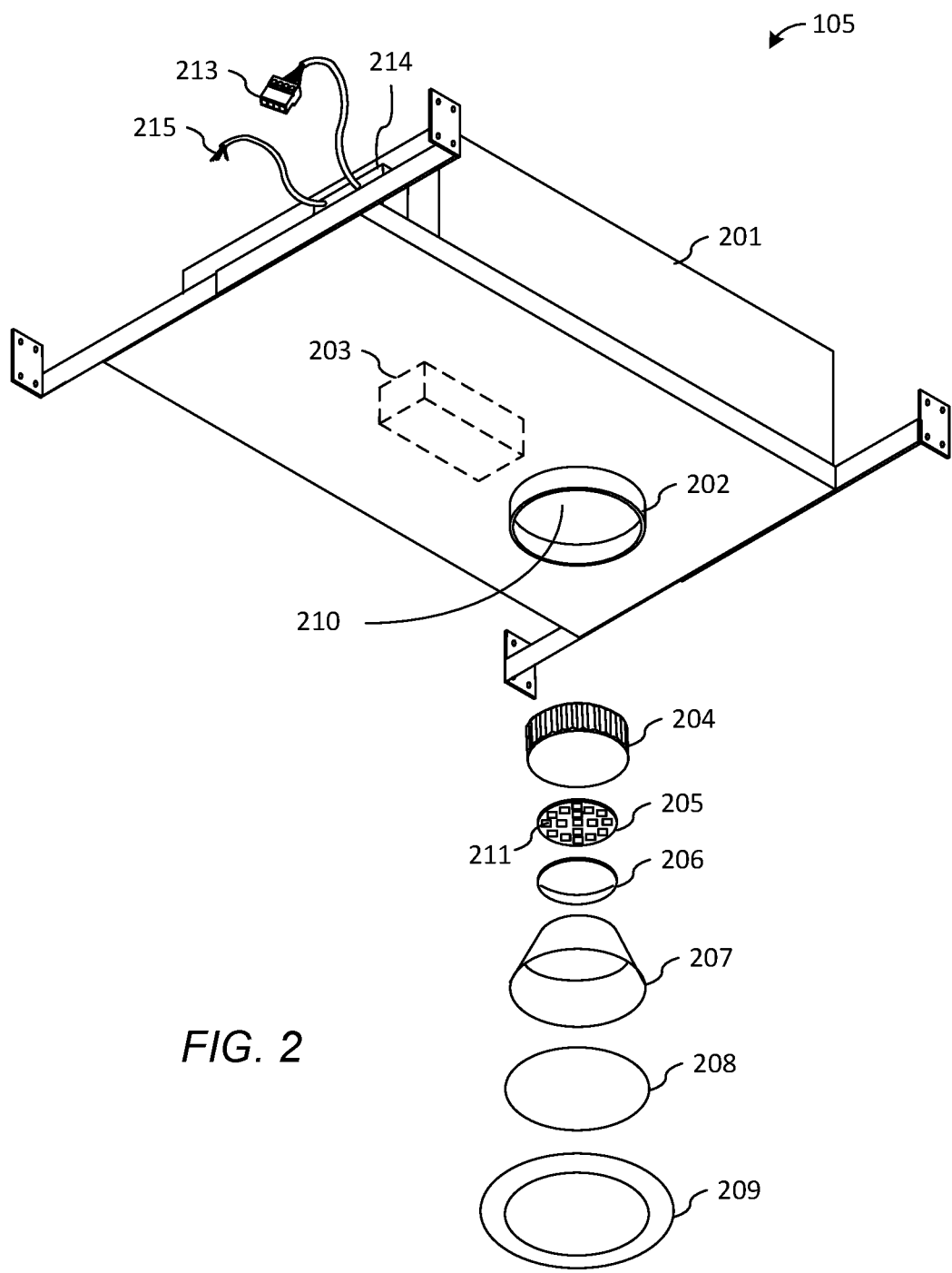

FIG. 2 illustrates an exploded perspective view a light fixture according to an illustrative embodiment.

Figure 3A:
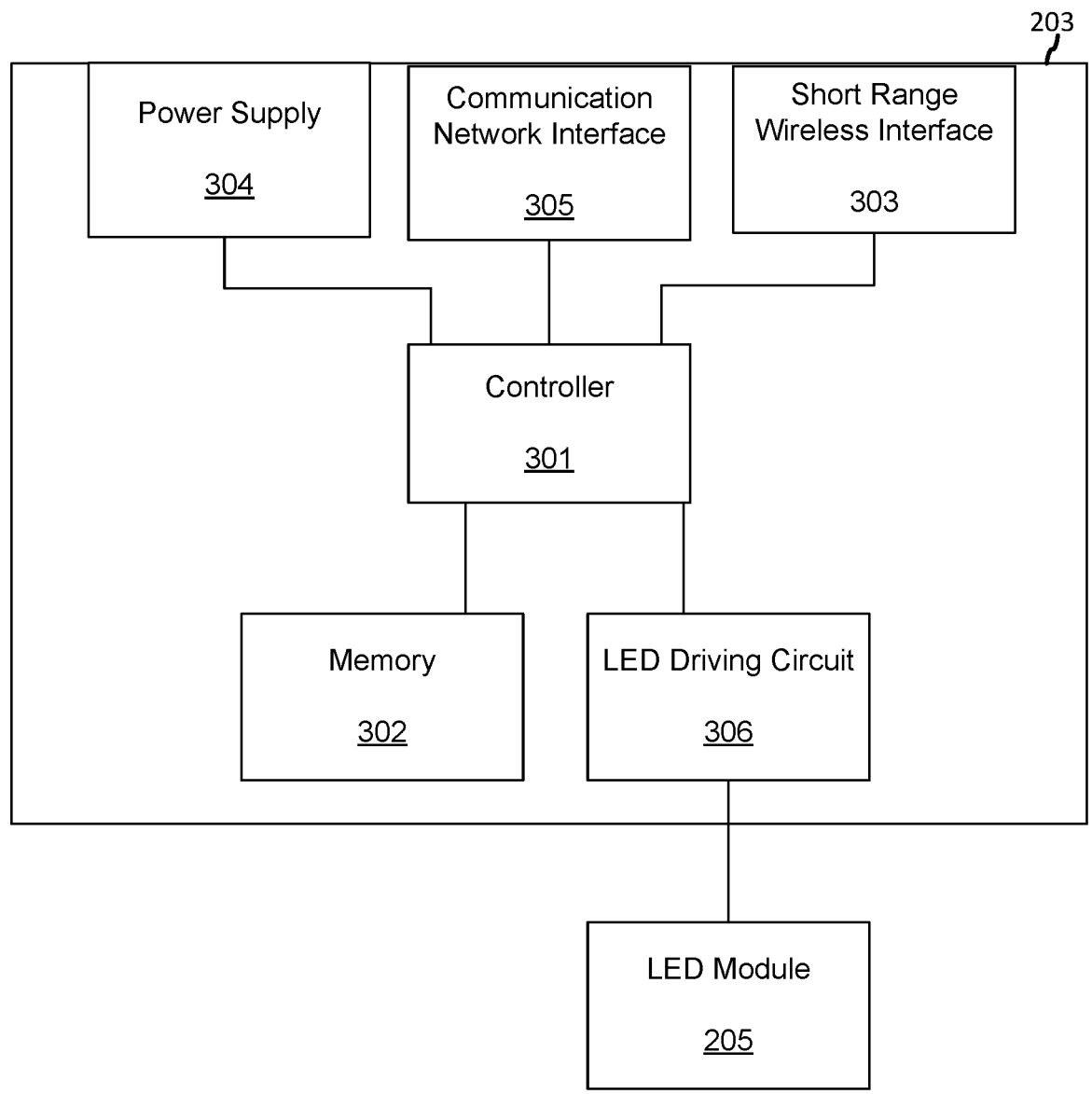

FIG. 3A illustrates a block diagram of an electronic device, such as the light fixture, of the building control system according to an illustrative embodiment.

Figure 3B:
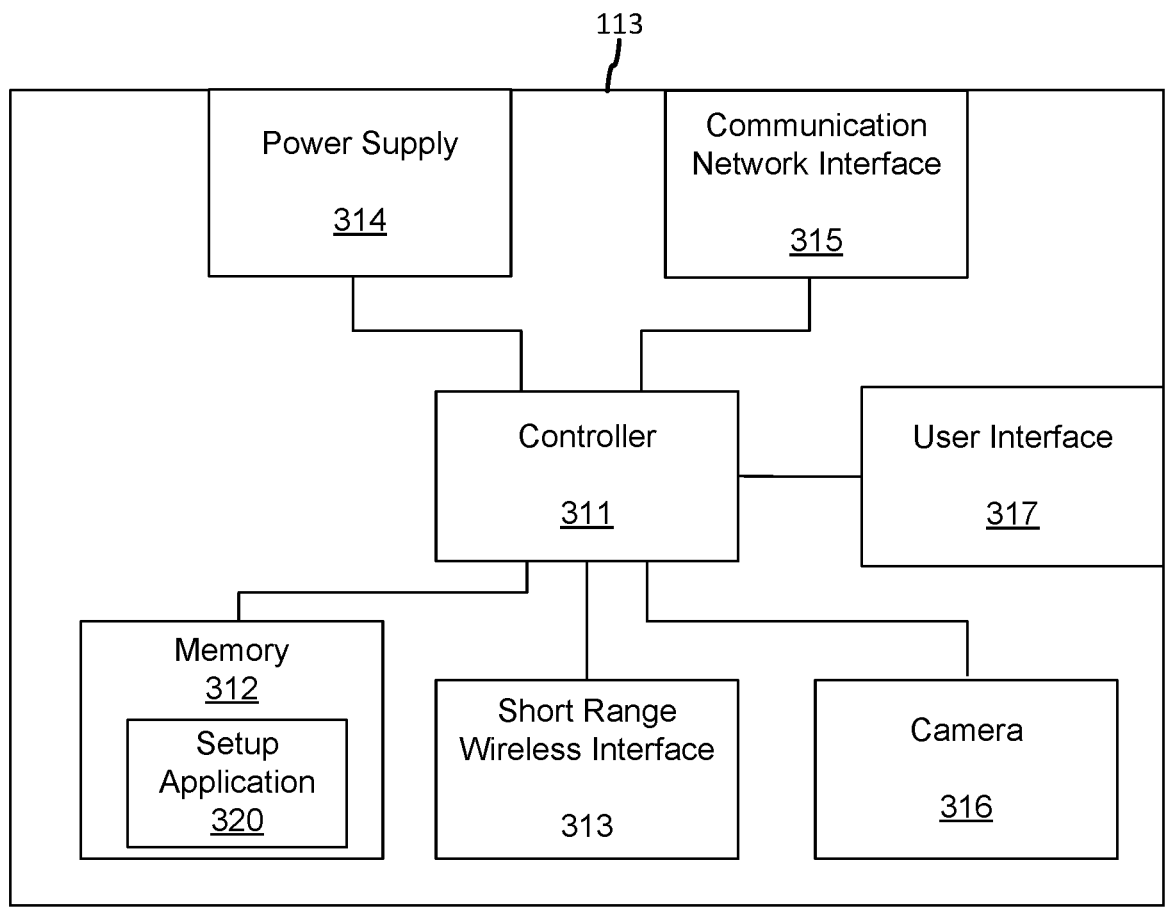

FIG. 3B illustrates a block diagram of a user device, such as a mobile device, that may run a setup application and communicate with the building control system according to an illustrative embodiment.

Figure 4:
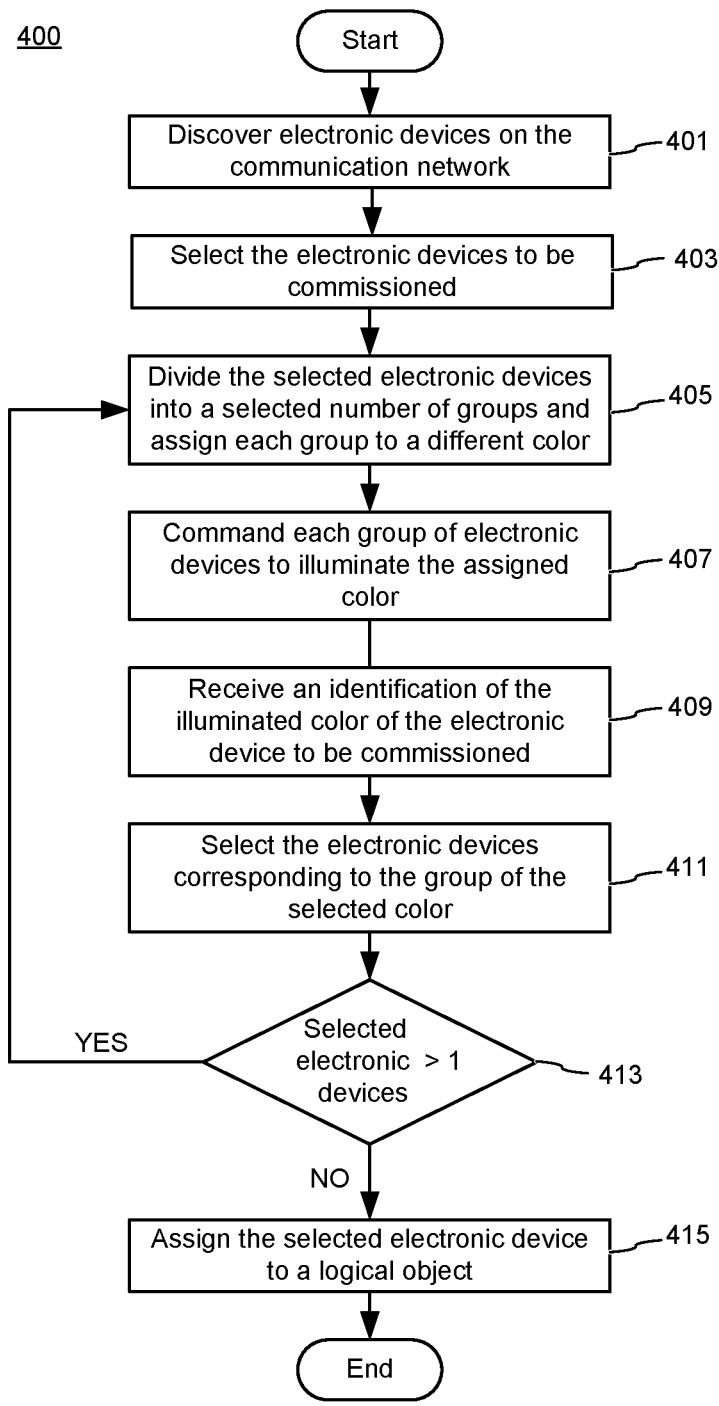

FIG. 4 illustrates a flowchart showing an exemplary method of commissioning electronic devices, such as light fixtures, of a building control system according to an illustrative embodiment.

Figure 5A:
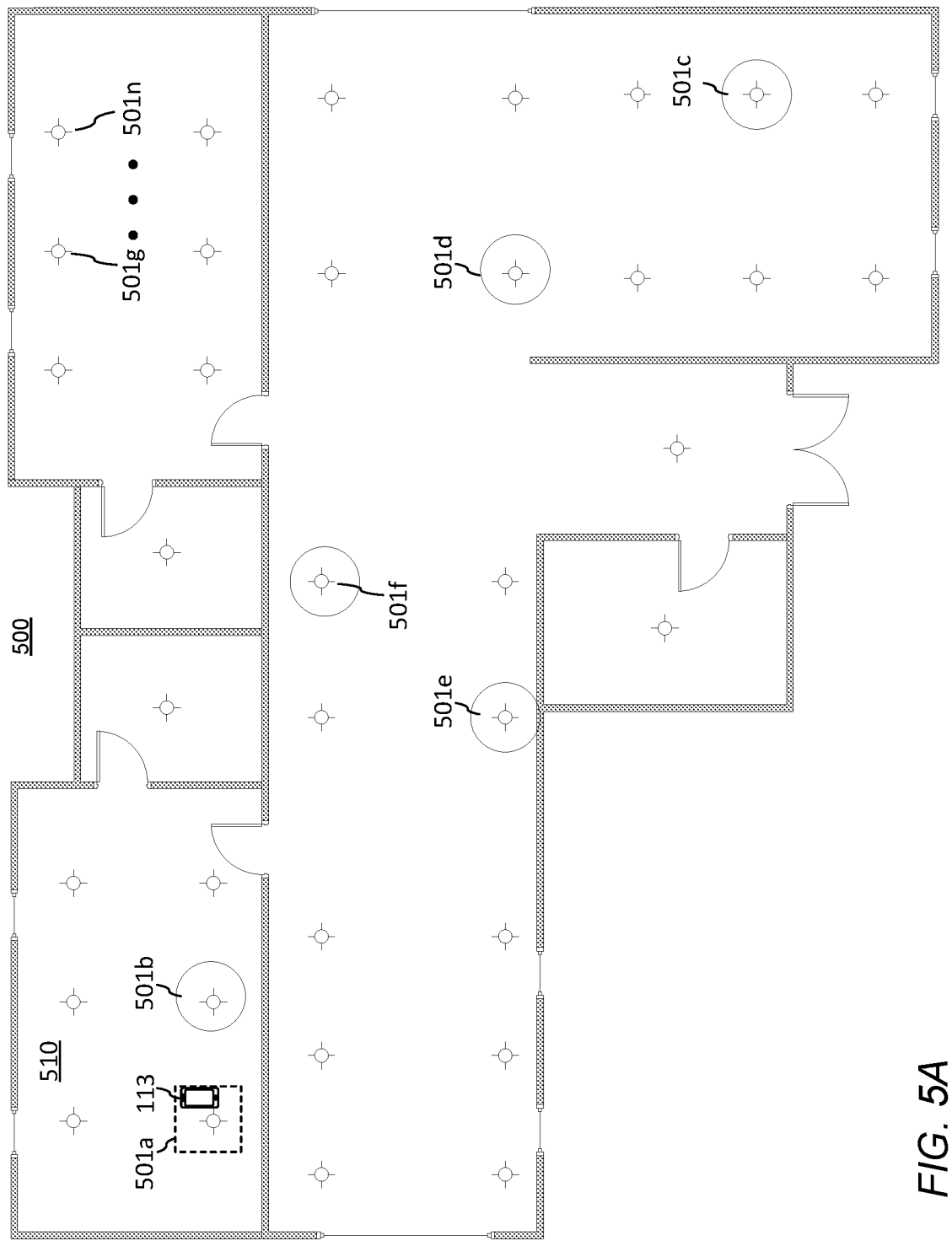

FIG. 5A illustrates an exemplary layout of a house comprising a plurality of light fixtures to be commissioned according to an illustrative embodiment.

Figure 5B:
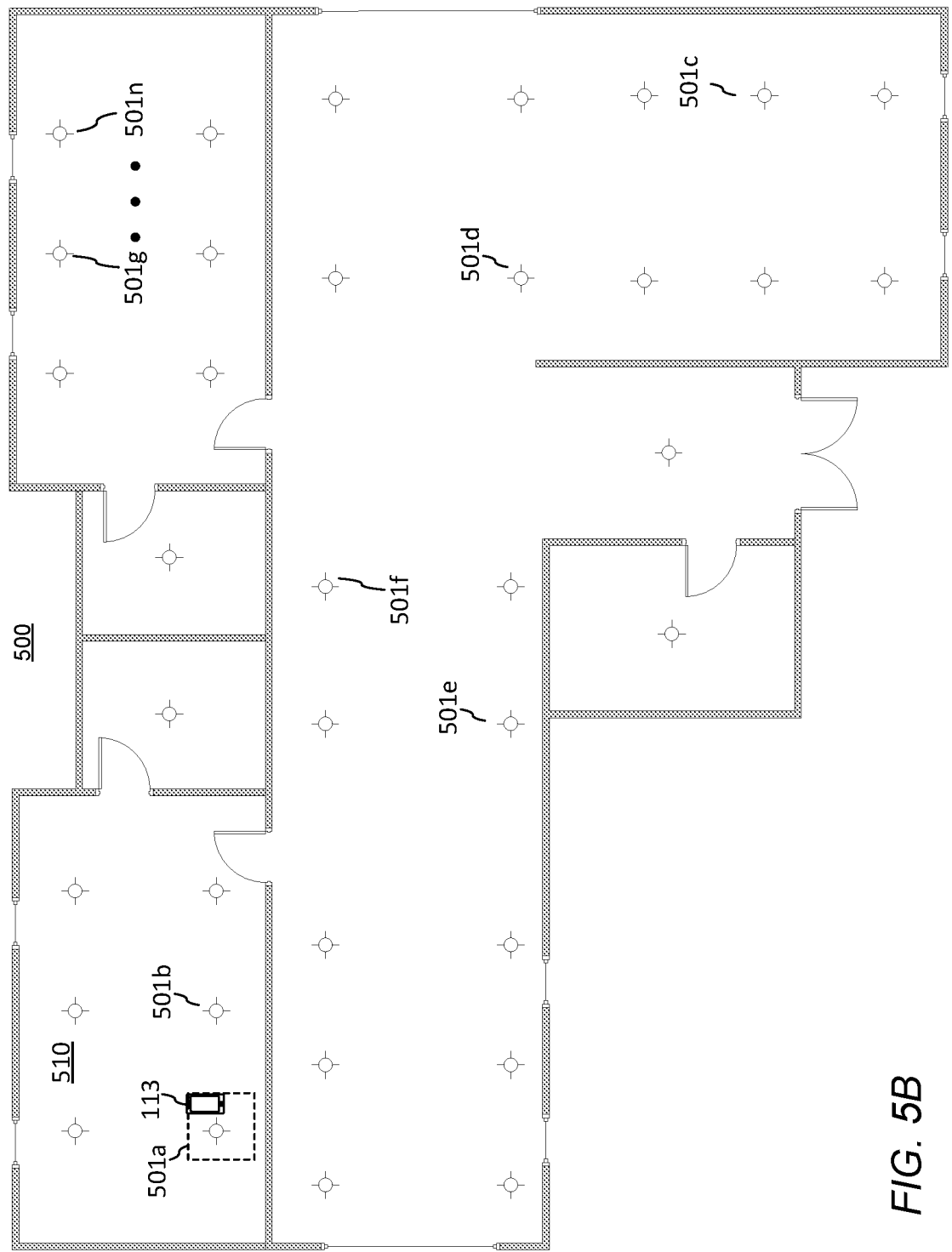

FIG. 5B illustrates an exemplary layout of the house comprising a subset of light fixtures to be commissioned according to an illustrative embodiment.

Figure 6A:
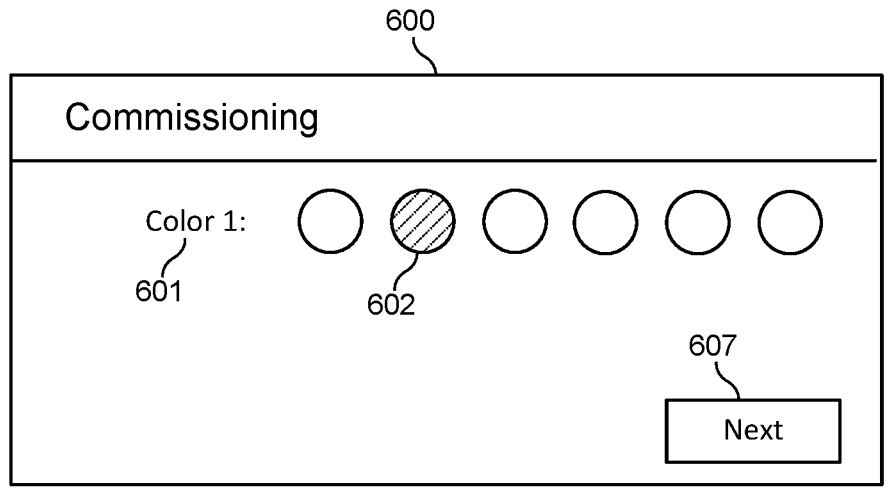

FIG. 6A illustrates an exemplary screenshot of a user interface of a mobile device running the setup application for commissioning the electronic devices of the building control system according to an illustrative embodiment.

Figure 6B:
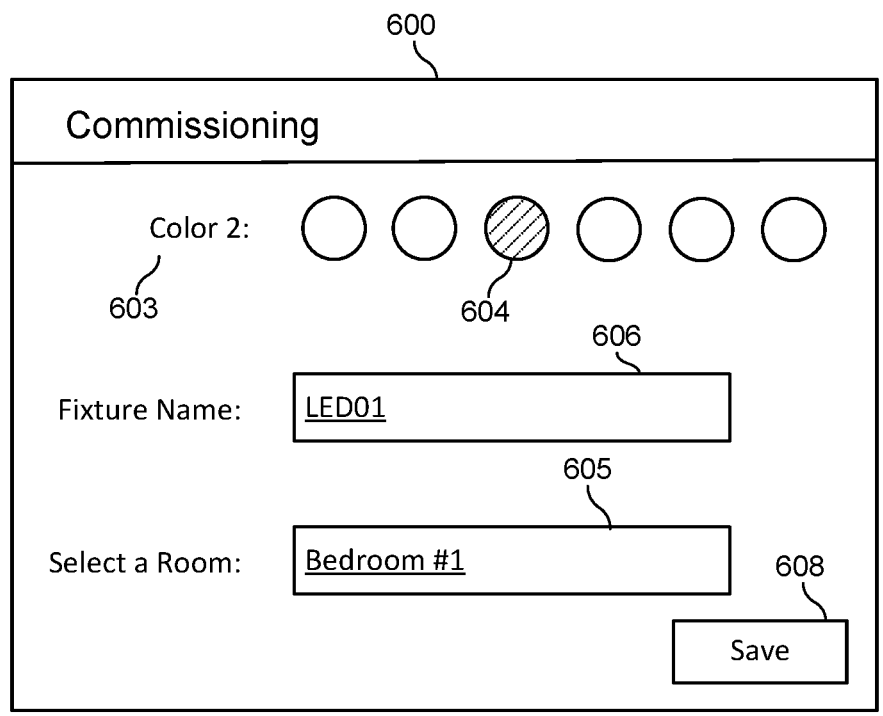

FIG. 6B illustrates another exemplary screenshot of a user interface of a mobile device running the setup application for commissioning the electronic devices of the building control system according to an illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of device.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 Building Control System
101 Control Processor
102a-b Control Devices/Keypads
103 Sensor
104 Shade Device
105 Lighting Device/Light Fixture
106 HVAC Control Device/Thermostat
110 Wired/Wireless Local Communication Network
111 Server
112 User Device/Computer/Portable Computer
113 User Device/Mobile Device
115 Lighting Load
116 Shading Load
117 Audiovisual Load
118 HVAC Load
130 LEDs
120 Wide Communication Network
201 Housing
202 Opening
203 LED Driver
204 Heatsink
205 Light Source/LED Module
206 Lens
207 Baffle
208 Light Diffuser
209 Trim
210 Interior Cavity
211 Light Sources/LED Elements
213 Terminal Block
214 Junction Box
215 Wire Leads
301 Controller
302 Memory
303 Short Range Wireless Interface
304 Power Supply
305 Communication Network Interface
306 LED Driving Circuit
311 Controller
312 Memory
313 Short Range Wireless Interface
314 Power Supply
315 Communication Network Interface
316 Camera
317 User Interface
320 Setup Application
400 A Flowchart Showing an Exemplary Method of Commissioning Electronic Devices, Such as Light Fixtures, of a Building Control System
401-415 Steps of Flowchart 400
500 House
501a-n Lighting Devices/Light Fixtures
510 Area of the House/Bedroom
600 User Interface
601 First List of Color Objects
602 First Selected Color Object
603 Second List of Color Objects
604 Second Selected Color Object
605 Logical Object
606 Logical Object
607 Next Button
608 Save Button

LIST OF ACRONYMS USED IN THE SPECIFICATION IN ALPHABETICAL ORDER

The following is a list of the acronyms used in the specification in alphabetical order.
AC Alternating Current
ASICs Application Specific Integrated Circuits
AV Audiovisual
COM Communication Port
DC Direct Current
HVAC Heating, Ventilation, Air Conditioning
IP Internet Protocol
IR Infrared
LED Light Emitting Diodes
MAC Media Access Control
PoE Power-over-Ethernet
PWM Pulse Width Modulation
RAM Random-Access Memory
RCPI Received Channel Power Indicator
RF Radio Frequency
RGB Red-Green-Blue
RISC Reduced Instruction Set Computer
ROM Read-Only Memory
RSSI Received Signal Strength Indication
USB Universal Serial Bus
WPAN Wireless Personal Area Network

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, NJ.

The present embodiments provide systems, methods, and modes for building control systems, and more specifically for the commissioning of a building control system. The embodiments of the building control system can be used in small, mid, or large scale residential or commercial installations. While the embodiments are described herein as being implemented for residential building commissioning and control, they are not limited to such an implementation. The present embodiments may be employed in other types of venues or facilities, including in commercial, retail, entertainment (such as theaters to commission theater lighting), or non-profit structures or venues. Additionally, while the building control system described herein for managing and/or controlling an entire building, it may be scaled up to control an entire campus of buildings or scaled down to control a floor or a section of a floor, such as a department, within a building. Furthermore, while the description herein is described as commissioning a lighting control system, the commissioning principles described herein may be applied to commission other electronic devices of a building control system, including one or more of heating, ventilation and air conditioning (HVAC), shading, security, appliances, door locks, and audiovisual (AV) equipment, among others.

FIG. 1 shows a building control system 100 that can be used in small, mid, or large scale commercial or residential installations, according to one embodiment. The building control system 100 can comprise a control processor 101 and one or more electronic devices 102a-b-106 interconnected via a local communication network 110. The control processor 101 operates to communicate with the electronic devices 102a-b-106 to transmit or receive control commands as well as status information. For example, the building control system 100 can utilize the PRO4 4-Series control processor available from Crestron Electronics, Inc. to network, manage, and control the building control system 100. Electronic devices can comprise control devices 102a-b such as keypads, sensors 103 such as occupancy, light, or temperature sensors, shade devices 104, lighting devices 105, HVAC control devices or thermostats 106, audiovisual devices, among other known devices used in building control systems.

Local communication network 110 may comprise a wired or a wireless network. In one embodiment, a wireless local communication network 110 can comprise one or more wireless personal area networks (WPANs). Communication protocols govern the operation of the wireless network 110 by governing network formation, communication, interferences, and other operational characteristics. For example, one such protocol is the ZigBee® protocol from the ZigBee Alliance. Another wireless communication protocol is the infiNET EX® protocol from Crestron Electronics, Inc. of Rockleigh, NJ. Although other protocols known in the art may be also used. In an embodiment, the wireless network 110 is automatically formed upon installation during a wireless network initialization process. Many of the configuration properties for forming the wireless network 110 can be preconfigured prior to initialization. According to another embodiment, a wired local communication network 110 can be implemented using bus wiring and serial ports, for example a communication (COM) port, a universal serial bus (USB) port, a Cresnet® port, or the like. The Cresnet® bus offers wiring and configuration, carrying bidirectional communication and 24 VDC power to each device over a simple 4-conductor cable.

The building control system 100 can further communicate with a remote server 111 via network 120, such as a wide communication network, to provide enhanced services and information to the building control system 100. Control processor 101 can communicate with server 111 to report data, obtain various data collected by the remote server 111, or to transmit or receive control commands. Building control system 100 can also communicate with user devices, such as a computer 112 and a mobile device 113 via the wide communication network 120, a local wired or wireless communication network 110, via a short range radio link, such as Bluetooth, or the like, or via any combinations thereof. User devices 112 and 113 may allow a user to configure and commission the building control system 100 or to control or remotely monitor and building's lighting, climate, and security system, for example, from another location.

Control devices of the building control system 100 may be connected to loads incapable of communicating with the control processor 101 to control such load in response to commands received by the control device directly from a user or from the control processor 101. For example, thermostat 106 may be used for heating and cooling control of baseboard, forced air, heat pump, and dual fuel heat pump HVAC loads 118. Control device 102b can comprise a keypad, a dimmer, or a switch to control loads such as a lighting load 115, a shading load 116, audiovisual load 117, or the like. For example, a control device 102b in the form of a dimmer or a switch can be connected to dim or turn on or off a lighting load 115. Control device 102b in the form of a keypad can comprise a plurality of buttons to control multiple controllable devices, such as to open or close a shading device 116 to a desired level. Those skilled in the art will recognize that additional control devices and/or loads devices can be integrated with the building control system 100.

Sensor 103 can comprise a light sensor adapted to detect light intensities and communicate the detected light intensity to the control processor 101, which for example may be used for daylight harvesting to effectively cut energy costs. For example, a light sensor can comprise a single photo-sensor having a single internal photocell with 0-65535 lux (0-6089 foot-candles) light sensing output. According to another embodiment, the light sensor can comprise a dual-loop photosensor with two photocells, one for open-loop daylight sensing and one for closed-loop ambient light sensing to measure light intensity from natural daylight and ambient light sources. The light sensor may for example be used to control the intensity of the lighting device 105 or a lighting load 115 that is being controlled by a control device 102b. Sensor 103 can alternatively comprise an occupancy sensor, such as an infrared sensor that generates a signal based on sensed infrared radiation of the monitored area. Although other sensors may be utilized without departing from the scope of the present embodiments, such as photosensors, ultrasonic sensors, various motion sensors, occupancy sensors, proximity sensors, sound sensors, microphones, ambient temperature sensors, or the like.

The building control system 100 can further comprise a lighting device 105 in the form of an intelligent light fixture capable of communicating with the control processor 101 over the local communication network 110. FIG. 2 illustrates an exploded perspective view of an exemplary intelligent light fixture 105 according to an illustrative embodiment.

Light fixture 105 can comprise housing 201 sized to be mounted in the ceiling in a joist cavity. Housing 201 may comprise metal material or any other material known in the art. Housing 201 may comprise an interior cavity 210 that may be substantially insulated from outside environment and may be adapted to house the electronics and mechanical components that make up the light fixture 105. Housing 201 may include an opening 202 through which the interior cavity 210 can be accessed and through which light exits the housing 201. The electronic and mechanical components of the light fixture 105 may include at least one LED driver 203, a heatsink 204, at least one light source such as an LED module 205, a lens 206, a baffle 207, a light diffuser 208, and a trim 209. Although the light fixture 105 may comprise a different configuration and components known in the art.

The light source of light fixture 105 may be adapted to emit a plurality of colors and may comprise an LED module 205 that comprises one or more LED elements or light sources 211 disposed on a printed circuit board. The LED module 205 is electrically connected to the LED driver 203 which independently controls and powers the LED elements 211 to emit light. Each light source 211 may comprise a multicolored light emitting diode (LED), such as a red-green-blue LED (RGB LED), comprising of red, green, and blue LED emitters in a single package. Although the LED elements 211 can comprise other color combinations of LED emitters, and/or can also comprise one or more white emitters. Each LED emitter can be independently controlled at a different intensity. According to an embodiment, each LED emitter of each LED element 211 can be controlled using pulse width modulation (PWM) signal with a constant current LED driver with output values ranging between 0 and 65535 for a 16-bit channel—with 0 meaning fully off and 65535 meaning fully on. Varying these PWM values of each of the red, green, and blue LED emitters on each LED element 211 allows the LED element 211 to create any desired color within the device's color gamut. Although according to another embodiment, the light source 205 may comprise different technology currently known or later developed capable of producing different colors of light. The present embodiments can also be implemented with LEDs capable of producing only a limited number colors. Furthermore, the present embodiments can be used with LEDs that can emit different color temperatures of white, such as tunable white LEDs, dim to warm LEDs, or LEDs with a plurality of predetermined color temperature settings, that can for example vary color temperatures anywhere between about 2000 Kelvin (K) and about 6500K, although that range can differ.

The LED driver 203 may be connected to a power supply 304 (FIG. 3) and to the building control system 100 to receive power and communication signals via wire leads 215 and a terminal block 213, respectfully. However, as discussed above, the LED driver 203 may communicate with the building control system 100 wirelessly.

The heatsink 204 is adapted to be in thermal conductive contact with the LED module 205 and/or the LED driver 203 to dissipate heat away from and cool the electrical components of the light fixture 105. This improves the efficiency and prolongs the life of the internal electronics of the light fixture 105. Heatsink 204 can comprise a plurality of fins to maximize its surface area and effectively dissipate heat. In various embodiments, the heatsink 204 comprises aluminum, aluminum alloy, copper, magnesium, manganese, silicon, tin, zinc, composite materials, any combinations thereof, or other materials known to those skilled in the art.

The lens 206 sets the beam angle and focus of the LED module 205. The baffle 207 can comprise a round, square, cone, or other shape to direct lights to a desired direction, depending on its shape and angle. It also covers the gap between the LED module 205 and the ceiling. The light diffuser 208 can comprise a decorative optic made from glass material that can be frosted to create diffused or soften light or textured with a pattern to reduce light glare. Although other materials may be utilized, such as plastic, fiberglass, or the like. In another embodiment, light diffuser 208 may comprise a grid, such as a honeycomb grid or a parabolic louver, to reduce glare and create diffused light. The trim 209 is the decorative part of the light fixture 105 that covers the hole cut in the drywall.

Referring to FIG. 3A there is shown an illustrative block diagram of the electrical components of an electrical device of a building control system, for example of a light fixture 105. Light fixture 105 comprises the LED driver 203 and the LED module 205. The LED driver 203 is electrically connected to and regulates the power supplied to the LED module 205. It can control the operation of the LED module 205 in a variety of ways, including, but not limited to, turning the LED module 205 on and off, dimming, incremental dimming, such as a high-medium-low operation, and adjusting the color of the light output, including color temperature adjustment or full color control, or the like. The LED driver 203 may comprise a controller 301, memory 302, LED driving circuit 306, short range wireless interface 303, a power supply 304, and a communication network interface 305.

The power supply 304 may be either packaged in the same package as the LED driver 203 or it may be external to the LED driver 203 and may be located, for example, in a junction box 214 connected to or housed in the housing 201. Power supply 304 provides power to the various circuit components of the light fixture 105 and for regulating voltage. According to an embodiment, the power supply 304 may be connected to a direct current (DC) voltage power source or an alternating current (AC) mains power source and may convert the AC signal to a direct current (DC). As shown in FIG. 2, light fixture 105 may comprise wire leads 215 for making line voltage connections within a junction box 214. In yet another embodiment, light fixture 105 may be powered using Power-over-Ethernet (PoE) or via a Cresnet® port. However, other types of connections or ports may be utilized.

The LED driver 203 may include a controller 301 comprising one or more microprocessors, such as "general purpose" microprocessors, a combination of general and special purpose microprocessors, or application specific integrated circuits (ASICs). Additionally, or alternatively, the controller 301 can include one or more reduced instruction set computer (RISC) processors, video processors, or related chip sets. The controller 301 can provide processing capability to execute an operating system, run various applications, and/or provide processing for one or more of the techniques and functions described herein. The LED driver 203 can further include a memory 302 communicably coupled to the controller 301 and can store data and executable code. Memory 302 can represent volatile memory such as random-access memory (RAM), but can also include nonvolatile memory, such as read-only memory (ROM) or Flash memory. In buffering or caching data related to operations of the controller 301, memory 302 can store data associated with applications running on the controller 301.

The LED driver 203 may comprise one or more LED driving circuits 306. The controller 301 controls the LED driving circuit 306 to output one or more drive signals to one or more LED modules 205 to perform a desired function as discussed above. Each drive signal can comprise a PWM signal or a similar signal, which drives the individual LED emitters of each LED element 211 of the LED module 205.

The LED driver 203 can further comprise one or more communication network interfaces 305, such as a wired or a wireless communication interface, configured for transmitting and receiving messages to or from the control processor 101 as well as various connected loads or electrical devices of the building control system 100 over the local communication network 110. Such messages may comprise control commands, firmware update information, device discovery information, device commissioning information, feedback or status information, such as reporting of lamp hours, lamp state, firmware version, estimated power consumption, or the like. A wireless network interface 305 may be configured for bidirectional wireless communication with other electronic devices over a wireless network. In various embodiments, the wireless interface can comprise a radio frequency (RF) transceiver, an infrared (IR) transceiver, or other communication technologies known to those skilled in the art. In one embodiment, the wireless interface communicates using the infiNET EX® protocol or the ZigBee® protocol. A wired communication interface 305 may be configured for bidirectional communication with other devices over a wired network. The wired interface can represent, for example, an Ethernet port, Cresnet® port, DMX port, DALI, 0-10V low voltage dimming port, CLX port, RGBW control ports, or the like. In various aspects of the embodiments, the LED driver 203 can both receive the electric power signal and control commands through a PoE interface. The light fixture 105 can be integrated with the building control system 100 and can receive control signals from the control processor 101 either directly or through an intermediary device such as a gateway and/or a wireless hub, or a similar device.

In yet another embodiment, the LED driver 203 can comprise a short range wireless interface 303, such as a Bluetooth wireless interface, to enable wireless communication with proximately located wireless devices, such as a mobile device 113 (e.g., a smartphone or a tablet), a portable computer 112, or other portable electronic devices known in the art.

Other electronic devices in the building control system 100, such as devices 102a-b, 103, 104, and 106, may comprise similar configuration, in terms of having a power supply 304, a controller 301, memory 302, a network interface 305 to communicate over the local communication network 110 with the control processor 101, and some may have a short range wireless interface 303. Some electronic devices in the building control system 100 may also comprise an LED driving circuit 306 and an LED module 205 comprising one or more multicolored LEDs 211 that can be implemented for the commissioning technique discussed herein, and which can be additionally used to provide backlighting and status indication post commissioning.

A user device, such as computer 112 and mobile device 113, may comprise a similar configuration as shown in FIG. 3B. For example, a user device 113 may comprise a power supply 314, a communication network interface 315, a controller 311, memory 312, short range wireless interface 313, camera 316, and a user interface 317. The controller 311 and memory 312 may comprise a similar configuration as to the controller 301 and memory 302 discussed above. Memory 312 may store a setup application 320 that is run by the controller 311 to commission the building control system 100 as discussed below. The power supply 314 may comprise a rechargeable battery. The communication network interface 315 is adapted to communicate with the control processor 101 via a communication network. For example, the user device 113 can communicate to the control processor 101 via wired communication by connecting the mobile device 113 via a wire to the control processor 101. In another embodiment, the user device 113 can communicate to the control processor 101 wirelessly via network 120, such as a wide communication network, a cellular communication network, or the like, via the local communication network 110, via another wireless network set up in the building or home such as a Wi-Fi network, or the like, or via any combinations thereof. The short range wireless interface 313 may comprise a similar configuration to short range wireless interface 303 such that it can communicate with the short range wireless interface 303 of the electronic device, e.g., the light fixture 105, of the building control system 100. The camera 316 may comprise a digital camera capable of recording images and video as is known in the art. The user interface 317 may comprise a display screen, touch screen, buttons, keyboard, mouse, or the like, or any combinations thereof.

After installing a plurality of the various electronic devices 102a-b-106 of the building control system 100 in a home or a building, the devices need to be commissioned such that they can be identified and assigned functions, grouped into groups/zones, or otherwise be integrated with the building control system 100. According to the present embodiments, the electronic devices, for example light fixtures 105, can be commissioned by the installer using a setup application 320. The setup application 320 can run on a control processor 101 or a remote server 111 and be accessible via a user device 112/113 through a web portal or a display screen connected to the control processor 101. In another embodiment, the setup application 320 can run locally on the user device 112 or 113. For the purposes of the below example, a user is using a setup application 320 running on a mobile device 113. FIG. 4 illustrates a flowchart 400 showing an exemplary method of commissioning electronic devices of the building control system 100. For the purposes of this example, reference is also made to FIGS. 5A-5B illustrating an exemplary layout of a house 500 comprising a plurality of light fixtures 501a-n to be commissioned. Although as further discussed below, the processes of FIG. 4 can be utilized in commission other types of electronic devices 102a-b-106 of the building control system 100. FIG. 6A-6B illustrate various screenshots of a user interface of a mobile device 113 running the setup application 320 for commissioning the light fixtures 501a-n.

After installing light fixtures 501a-n in various locations throughout the house 500, they may be commissioned. The user using the setup application 320 on a mobile device 113 may initiate the commissioning process by pressing a button on the user interface 317 of the mobile device 113. In response, in step 401, the controller 311 of the mobile device 113 may communicate with the control processor 101 to poll, address, and discover the various electronic devices connected to the communication network 110 that are compatible with the building control system 100. During discovery, the control processor 101 may assign an address to each discovered light fixture 501a-n such that each light fixture 501a-n can be individually addressed. During the discovery process, each light fixture 501a-n may transmit information to the control processor 101, including about information, default device name, model, device identifier, serial number, IP address, MAC address, hostname, status, lamp hours, lamp state, estimated power, online/offline status, software version, among other information known in the art. In another embodiment, the control processor 101 may assign light fixtures 501a-n to temporary addresses shared by multiple devices to be used solely for the commissioning process. According to an embodiment, the discovered light fixtures 501a-n may be displayed to the user on a user interface 317 of the mobile device 113 in a list form or another form. For the house 500 shown in FIGS. 5A, the control processor 101 would discover thirty-six light fixtures 501a-n. Without commissioning the light fixtures 501a-n, it is unknown where in the house 500 each of the discovered light fixtures 501a-n is located as they are not logically assigned to rooms. Moreover, since the light fixtures 501a-n are discretely addressed, they can be also discretely controlled. Thus, they need to be paired such that they can be controlled as groups of loads. This will allow a user to not only control an individual load, but also to be able to control all or a portion of the lighting loads in a room, as desired.

In step 403, the controller 311 of the mobile device 113 running the setup application 320 may initially select all of the discovered light fixtures 501a-n to be commissioned. Although according to alternative embodiments, as discussed below, the controller 311 may select a subset of the light fixtures 501a-n to be commissioned, for example based on a predetermined factor or based on user selection. In step 405, the controller 311 divides the selected light fixtures 501a-n into a selected number of groups and assigns each group to a different color selected from a group of predetermined colors. The number of groups and colors to be used may be predetermined or selected by the controller 311 using an algorithm based on the number of selected fixtures to be commissioned to reduce the number of commissioning iterations. For example, if there are fewer light fixtures than available colors, the controller 311 may choose a subset of available colors. In addition, the controller 311 may limit the number of colors to use based on the colors the light fixtures or others LED sources are capable of producing. As an example, six colors may be used, such as red, orange, green, blue, yellow, and purple, to commission thirty-six light fixtures 501a-n. Although as few as two colors may be used, it is desired to use more than two colors to speed up the fixture identification process. Because the light fixtures 501a-n according to the present embodiments can produce substantially any color, many colors may be implemented. In step 407, the controller of the mobile device 113 sends commands to the discovered light fixtures 501a-n to illuminate each group of light fixtures 501a-n with the assigned color. For example, for six colors, the thirty six light fixtures 501a-n will be divided into six groups each containing six fixtures. Each command may contain a device identifier and an assigned color. The commands may be transmitted from the mobile device 113 directly to the light fixtures 501a-n, or through the control processor 101. Each light fixture 501a-n receiving its respective command will illuminate its LED 205 with the assigned color.

In step 409, the controller 311 of the mobile device 113 receives an identification of the illuminated color of the light fixture to be commissioned. According to one embodiment, the mobile device 113 may receive the color identification from a user input. For example, referring to FIG. 5A, the controller 311 of the mobile device 113 can provide instructions to the user to approach a light fixture the user wishes to commission first. The user may for example stand under light fixture 501a in an area of the house 500, such as bedroom 510, to commission it first. Six of the light fixtures 501a-f dispersed in house 500 may for example be illuminated in red, while the rest of the light fixtures 501g-n in the house 500 may be assigned to other color groups and be illuminated in different colors. As shown in FIG. 6A, the user interface 600 may display a first list 601 of color objects corresponding to the number of the predetermined colors. The user may select the color object 602 on the user interface 600 to identify the color illuminated by the light fixture 501a which the use desires to commission, in this case red, and press the Next button 607. In step 411, the controller 311 of the mobile device 113 selects the group of light fixtures 501a-f that illuminated the color corresponding to or that match the selected identified color—in this case all of the light fixtures 501a-f that illuminated the red color.

In step 413, the controller 311 of the mobile device 113 determines whether the number of the selected light fixtures 501a-f is greater than one. For example here, there are six selected fixtures. If the number of the selected light fixtures 501a-f is greater than one, the controller 311 of the mobile device 113 returns to step 405 and divides the selected light fixtures 501a-f into a selected number of groups and assigns each group to a different color selected from the group of predetermined colors. In step 407, the controller 311 sends commands to the selected light fixtures 501a-f to illuminate each group of light fixtures 501a-f with the assigned color. In step 409, the controller 311 again queries and receives input from the user identifying the illuminated color of the light fixture 501a to be commissioned. In the present example, the six remaining light fixtures 501a-f may be divided into six groups each containing one fixture. Referring to FIG. 5B, in this scenario, light fixture 501a may for example be illuminated in blue, while the rest of the selected light fixtures 501b-f may be illuminated in different colors. As shown in FIG. 6B, user interface 600 may display a second list 603 of color objects corresponding to the number of predetermined colors. The user may select the color object 604 to identify the color illuminated by the light fixture 501a under which the user is standing. In step 411, the controller 311 selects the light fixtures 501a corresponding to the group of the selected identified color—in this case the light fixture 501a that was illuminated in the blue color.

Since there is only one fixture left, the number of selected fixtures in step 413 is not greater than one and the process proceeds to step 415. As is apparent, the number of iterations through steps 405-413 increases as the number of light fixtures 501a-n in a building increases. Similarly, the number of iterations through steps 405-413 decreases as the number of predetermined colors increases. In step 415, the controller 311 of the mobile device 113 will assign the identified light fixture 501a to one or more selected logical objects. For example, the user may assign a logical name to each discrete commissioned light fixture 501a. In addition, the user may assign a plurality of fixtures 501a-n to a single logical object to be logically grouped together. Referring to FIG. 6B, the user may assign a logical name to light fixture 501a by entering a fixture name in field 606. The user may also assign light fixture 501a to be associated with a logical group object, for example logical group object titled "Bedroom #1" associated with the house area 510. The user may enter a desired name for the logical group object in a field object 605, or select a logical group object from a drop down menu and press the Save button 608. Instead of a room, the logical group object may represent a zone, or the like. The user may also assign the identified light fixture 501a to a control point, such as a keypad 102a.

The user may then proceed to commission the remainder of the light fixtures in the bedroom area 510 according to the same steps discussed above and also assign them to logical object "Bedroom #1". Then, the user may proceed to commission the rest of light fixtures 105a-n installed in the remainder of the house 500 according to the same steps discussed above and assign them to other logical objects. According to an embodiment, once a device is already commissioned and/or assigned to a logical object, that device is removed from a list of devices to be commissioned, or in other words, it is not selected by the controller 311 to be commissioned in step 403. This effectively will further reduce the iterative steps as the number of devices to be commissioned decreases with each completed device commissioning process shown in FIG. 4. As shown above, a logical object may consist of a single fixture such that the fixture can be controlled individually, or a logical object may represent a logical grouping of one or more individual fixtures to behave as a single lighting load, thereby allowing to pair lighting loads into groups. The user can set predetermined or selected functions or attributes to logical objects, such as selecting color temperature, dimming level, or the like, or set predetermined scenes for the light fixtures in a logical object. In addition, the user may also individually select and set features or control specific light loads.

According to another embodiment, the controller 311 of the mobile device 113 may utilize the short range wireless interface 303 of the light fixtures 501a-n to reduce the number of iterations needed to identify a light fixture 501a-n to commission. The controller 311 of the mobile device 113 may instruct the user device 113 to communicate via its short range wireless interface 313 to the short range wireless interface 303 of the light fixtures 501a-n, for example via the Bluetooth wireless communication protocol. The user device 113 may receive messages back from nearby light fixtures, for example from light fixtures located in room 510 and/or proximate to room 510. The controller 311 may read and measure the received wireless signal strengths of the nearby light fixtures relative to the mobile device 113. In other words, the controller of the mobile device 113 can measure the intensity of the received radio wave signals from nearby light fixtures 501a-n using the Received Signal Strength Indication (RSSI) or the Received Channel Power Indicator (RCPI) techniques. Then, in step 403, the controller 311 may select a predetermined number of the nearest light fixtures 501a-n to be commissioned based on the received and measured signal strength. For example, six nearest light fixtures may be selected. The controller 311 of the mobile device 113 may then go through the commissioning process discussed with reference to steps 405 through 415 in FIG. 4 above. Since the selected light fixtures to be commissioned in step 403 is less than all of the light fixtures 501a-n installed in the house 500, the number of iterations required to identify the light fixture 501a is reduced.

According to yet another embodiment, the controller 311 may utilize the camera 316 of the mobile device 113, or a camera connected to the mobile device 113, for automatic color identification in steps 409, instead of querying the user to identify the illuminated color. The controller 311 may instruct the user to point the camera 316 towards the light fixture 501a. The controller 311 may use the camera 316 of the mobile device 113 to detect and identify the color that is being illuminated by the light fixture 501a. Because the camera 316 is more sensitive to changes in color than the human eye, a larger number of colors may be utilized to illuminate the various light fixtures 501a-n in the house 500 which can be readily detected and identified using the camera 311 of the mobile device 113. Using the mobile device camera 313 in combination with a large number of colors will thereby reduce the iterations of steps 405-413 required to identify the light fixture 501a. The camera 316 can also be used to detect variations in color temperature, and as such, can be used to identify light fixtures based on color temperature variations—i.e., soft white (2700K to 3000K), warm white (3000K to 4000K), bright white (4000K to 5000K), versus daylight (5000K to 6500K). This will allow the present embodiments to identify electronic devices with LEDs that are only capable of illuminating different color temperatures. Furthermore, using a camera 316 eliminates human interaction, making the iterative identification process faster and less prone to human error. Particularly, the controller 311 may instruct the user to point the camera 315 towards the light fixture 501a for a predetermined amount of time. The controller 311 may then perform the iterative process in steps 405-413 by changing light fixture color, detecting the illuminated color, and identifying the light fixture within that predetermined amount of time. For example, the controller 311 may instruct the user to point the camera 313 at the light fixture 501a for five seconds. The controller 311 may then change and detect the illuminated light fixture within the five second period until the light fixture 501a is identified.

According to another embodiment, the illuminated color may be automatically identified using a light color sensor. The light color sensor can be built into the mobile device 113 or it may be a separate light color sensor capable of communicating with the mobile device 113 via wired or wireless communication. The light color sensor may comprise a plurality of photodiodes adapted for sensing color components of light. For example, the controller 311 may receive color identification from the light color sensor described in U.S. Pat. No. 11,002,605, issued on May 11, 2021, the entire disclosure of which is hereby incorporated by reference.

According to another embodiment, instead of emitting a single color at a time, a light fixture 501a may be commanded to emit a color sequence which can be detected using the camera 316 or a light color sensor and identified using the controller 311. The controller 311 may assign a discrete color sequence to each light fixture 501a-n. The color sequence may be selected by the controller 311 from a plurality of color sequences or it may be generated using an algorithm based on the number of fixtures to be commissioned. Each color sequence may consist of a plurality of randomly selected colors to be illuminated in a random order. For thirty-six fixtures 501a-n, for example, thirty-six color sequences may be generated. Accordingly, the iterative process of identifying a light fixture 501a is eliminated.

According to a further embodiment, additional states may be included in addition to a color state in order to identify a device. For example, a state may include whether a light fixture 501a is "on" or "off". Another states may include a blinking state (i.e., whether the light fixture 501a is blinking or nor) or a blinking sequence state. Other types of states may be also combined with the color state. For example, a blinking pattern may be utilized with a color state to distinguish fixtures or electronic devices from one another. Other types of states may be used to further reduce the iterative process.

According to a further embodiment, the commissioning steps described with reference to FIG. 4 may be used to commission other types of electronic devices of the building control system 100, such as devices 102a-b-104 and 106. Referring to FIG. 1, other electronic devices 102a-b-104 and 106 of the building control system 100 may include multicolored LEDs 130, similar to LED module 205. Such LEDs 130 are typically utilized in such electronic devices for status indication, backlighting, or the like. LEDs 130 may be driven using integrated LED drivers, similar to driver 203, which may be controlled by the control processor 101 and/or the mobile device 113. These LEDs 130 can be illuminated in different colors and utilized by the controller 311 of the mobile device 113 running the setup application 320 to commission the electronic devices 102a-b-104 and 106. For example, sensor 103 and shading device 104 may include multicolored LEDs 130 that are otherwise used for status indication. Thermostat 106 may include LEDs 130 for backlighting and/or additional LEDs 130 for status indication. Control devices in the form of keypads 102a-b may include LEDs 130 that are otherwise used for status indication or to backlight the indicia of the various buttons of the keypads 102a-b. Other electronic devices of the building control system 100 may comprise similar multicolored LEDs 130. These LEDs 130 may be implemented for identifying and commissioning of the electronic devices 102a-b-106 of the building control system 100 pursuant to the embodiments discussed above. According to an embodiment, for electronic devices with plurality of LEDs 130, such as keypads 102a-b containing LEDs for each button, the plurality of LEDs 130 may be illuminated in different colors according to a color sequence or array at the same time. This color sequence or array may be detected and identified via the motile device 113.

INDUSTRIAL APPLICABILITY

The disclosed embodiments provide a system, software, and a method for commissioning a building control system. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

Moreover, the process for commissioning the building control system is not meant to limit the aspects of the embodiments, or to suggest that the aspects of the embodiments should be implemented following the configuration process. The purpose of the configuration process is to facilitate the understanding of one or more aspects of the embodiments and to provide the reader with one or many possible implementations of the process discussed herein. The steps performed during the commissioning process are not intended to completely describe the process but only to illustrate some of the aspects discussed above. It should be understood by one of ordinary skill in the art that the steps may be performed in a different order, additional steps may be added, and that some steps may be eliminated or substituted. Additionally, some or all of the steps 401-415 may be performed either locally or remotely by any one of the controllers or processors of components of the building control system 100, such as the control processor 101, electronic devices 102a-b-106, server 111, user devices 112 or 113, and/or any combinations thereof.

What is claimed is:

1. A system for commissioning a building control system comprising:
    a plurality of electronic devices installed in a building and comprising at least one light source adapted to illuminate light of a plurality of colors; and
    at least one controller in communication with the plurality of electronic devices and adapted to iteratively divide a selected number of the plurality of electronic devices into groups of electronic devices and command each group of electronic devices to illuminate a different color, receive an identification of an illuminated color of an electronic device to be commissioned, and select electronic devices belonging to a group commanded to illuminate a color that matches the identified illuminated color until the electronic device to be commissioned is identified.

2. The system of claim 1, wherein the at least one controller is adapted to identify the electronic device to be commissioned when a number of the selected electronic devices belonging to a group commanded to illuminate the identified illuminated color is equal to one.

3. The system of claim 1, wherein the different colors comprise at least one selected from the group consisting of a plurality of single colors, a plurality of different color temperatures, a plurality of different sequences of colors, and any combinations thereof.

4. The system of claim 1, wherein the at least one controller is further adapted not to select electronic devices belonging to groups commanded to illuminate colors that do not match the identified color.

5. The system of claim 1, wherein the identification of the illuminated color is received from at least one selected from the group consisting of a user interface, a camera, a light color sensor, and any combinations thereof.

6. The system of claim 1, wherein the at least one controller is further adapted to measure wireless signal strengths of the plurality of electronic devices and select the selected number of the electronic devices with the strongest wireless signal strengths.

7. The system of claim 1, wherein the controller is adapted to assign the identified electronic device to a logical object.

8. The system of claim 7, wherein the logical object comprises at least one selected from the group consisting of a logical object associated with another electronic device, a logical object associated with a load, an electronic device name, a room name, an area name, a zone name, a group name, a function, a setting, a command, an event, a scene, and any combination thereof.

9. The system of claim 7, wherein the logical object is received from a user interface.

10. The system of claim 1, wherein the at least one light source comprises a multicolored light emitting diode.

11. The system of claim 1, wherein the at least one controller comprises an electronic device, an electronic device of the plurality of electronic devices, a control device, a mobile device, a control processor of the building control system, a remote server, or any combinations thereof.

12. The system of claim 1, wherein the at least one controller is further adapted to select the different colors based on the selected number of the plurality of electronic devices, based on colors capable of being illuminated by the selected electronic devices, or based on any combinations thereof.

13. A method for commissioning a building control system comprising at least one controller in communication with a plurality of electronic devices installed in a building and comprising at least one light source adapted to illuminate light of a plurality of colors, the method comprising the steps of:
 (a) selecting a plurality of electronic devices to commission;
 (b) dividing the selected electronic devices into groups of electronic devices;
 (c) commanding each group of electronic devices to illuminate a different color;
 (d) receiving an identification of an illuminated color of an electronic device to be commissioned;
 (e) selecting electronic devices belonging to a group commanded to illuminate a color that matches the identified illuminated color; and
 (f) repeating steps (b) through (e) until the electronic device to be commissioned is identified.

14. A method for commissioning a building control system comprising at least one controller in communication with a plurality of electronic devices installed in a building and comprising at least one light source adapted to illuminate light of a plurality of colors, the method comprising the steps of:
 (a) selecting a plurality of electronic devices to commission;
 (b) dividing the selected electronic devices into groups;
 (c) commanding each group of electronic devices to illuminate a different color from a plurality of predetermined colors;
 (d) receiving an identification of an illuminated color of an electronic device to be commissioned;
 (e) selecting electronic devices belonging to a group commanded to illuminate the identified illuminated color; and
 (f) repeating steps (b) through (e) when a number of the selected plurality of electronic devices to commission is greater than the number of a plurality of predetermined colors until the electronic device to be commissioned is identified.

15. A system for commissioning a building control system comprising:
 a plurality of electronic devices installed in a building and comprising at least one light source adapted to illuminate light of a plurality of colors; and
 a mobile device comprising a camera and a controller adapted to iteratively divide a selected number of the plurality of electronic devices into groups of electronic devices and command each group of electronic devices to illuminate a different color, detect an illuminated color of an electronic device to be commissioned via the camera, and select electronic devices belonging to a group commanded to illuminate a color that matches the detected color until the electronic device to be commissioned is identified.

16. The system of claim 15, wherein the at least one controller is adapted to identify the electronic device to be commissioned when a number of the selected electronic devices belonging to a group commanded to illuminate the identified illuminated color is equal to one.

17. The system of claim 15, wherein the different colors comprise at least one selected from the group consisting of a plurality of single colors, a plurality of different color temperatures, a plurality of different sequences of colors, and any combinations thereof.

18. The system of claim 15, wherein the controller is adapted to assign the identified electronic device to a logical object.

19. The system of claim 18, wherein the logical object comprises at least one selected from the group consisting of a logical object associated with another electronic device, a logical object associated with a load, an electronic device name, a room name, an area name, a zone name, a group name, a function, a setting, a command, an event, a scene, and any combination thereof.

20. A method for commissioning a building control system comprising a mobile device having a camera and a plurality of electronic devices installed in a building each comprising at least one light source adapted to illuminate light of a plurality of colors, the method comprising the steps of:
 (a) selecting a plurality of electronic devices to commission;
 (b) dividing the selected electronic devices into groups of electronic devices;
 (c) commanding each group of electronic devices to illuminate a different color;
 (d) detecting an illuminated color of an electronic device to be commissioned via the camera;
 (e) selecting electronic devices belonging to a group commanded to illuminate a color that matches the detected color; and
 (f) repeating steps (b) through (e) until the electronic device to be commissioned is identified.

* * * * *